No. 786,656. PATENTED APR. 4, 1905.
J. A. MacMAHON.
FISHING REEL BRAKE.
APPLICATION FILED APR. 27, 1904.
Fig. 1.
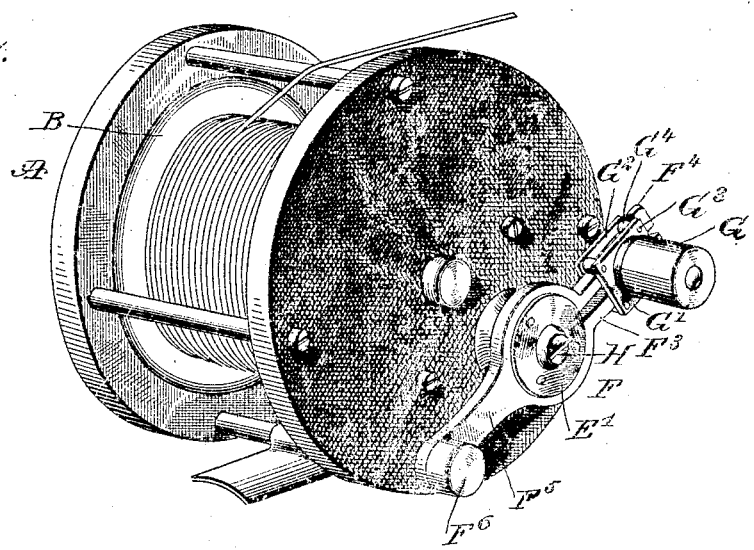
Fig. 2.
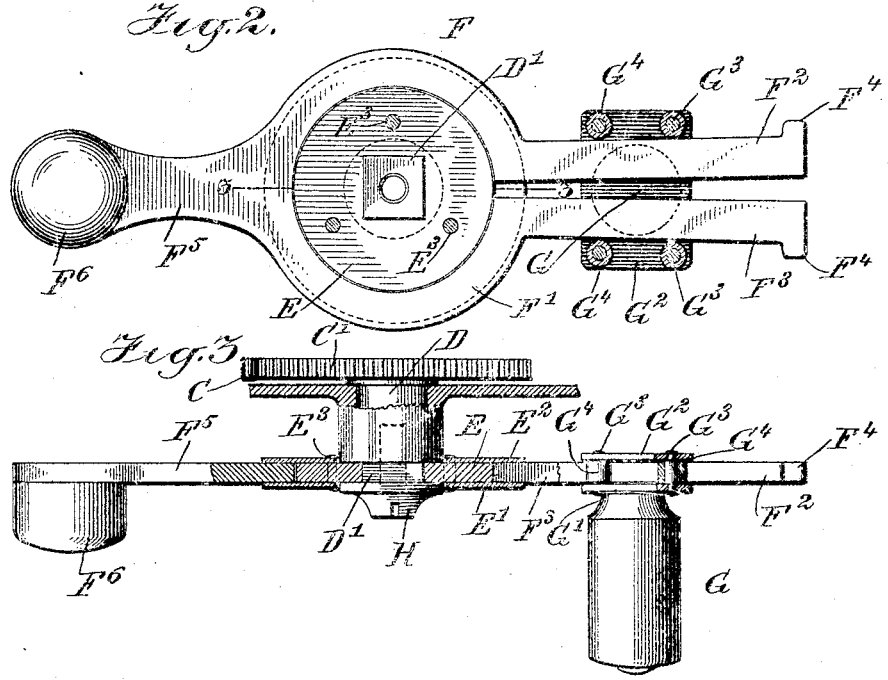
Fig. 3.
WITNESSES:
INVENTOR
James A. MacMahon
BY
ATTORNEYS No. 786,656.                                         Patented April 4, 1905.

UNITED STATES PATENT OFFICE.

JAMES A. MacMAHON, OF NEW YORK, N. Y.

FISHING-REEL BRAKE.

SPECIFICATION forming part of Letters Patent No. 786,656, dated April 4, 1905.

Application filed April 27, 1904. Serial No. 205,081.

*To all whom it may concern:*

Be it known that I, JAMES A. MACMAHON, a citizen of the United States, and a resident of the city of New York, borough of Brooklyn, in the county of Kings and State of New York, have invented a new and Improved Fishing-Reel Brake, of which the following is a full, clear, and exact description.

The object of the invention is to provide a new and improved fishing-reel brake arranged to allow freedom of movement of the spool when the line is run out, to prevent backlash, and to permit the fisherman to give any desired resistance to the reel with a view to increase or decrease the tension of the line when the fish is hooked or other circumstances require it.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement as applied. Fig. 2 is an enlarged sectional side elevation of the improvement, and Fig. 3 is a sectional plan view of the same on the line 3 3 of Fig. 2.

The improved brake is shown applied to a fishing-reel having the usual case or housing A, the spool B for the line, and a multiple gear rotating the spool and consisting of a pinion C in mesh with a master-wheel C', secured on a shaft D, (see Fig. 3,) journaled in one side of the housing A of the reel. On the outer polygonal end D' of the shaft D is secured a friction-disk E, having front and rear flanges E' and E² attached to the disk by transverse rivets, screws, or like fastening devices as illustrated in the drawings. The peripheral surface of the friction-disk E is engaged by the split ring F' of a crank-arm F, employed for turning the shaft D to cause the gearing to rotate the spool B for winding up or unwinding the line.

The crank-arm F is so arranged that it forms, with the friction-disk E, the brake for the fishing-reel, and for the purpose mentioned the crank-arm F has the ends of its split ring F' terminating in longitudinally-extending but diverging arms F² and F³, on which is held to move inwardly or outwardly the handle G of the crank-arm, the said handle being arranged to draw the arms F² and F³ together on moving the handle G outward to clamp the split ring F' more firmly onto the periphery of the friction-disk E, it being understood, however, that when the handle G is moved into its innermost position then the frictional contact between the split ring F' and the friction-disk E is reduced to a minimum to allow free revolving of the spool B on the slightest pull on the line and when holding the crank-arm F stationary.

The handle G is provided with two plates G' and G², disposed on opposite faces of the oblique arms F² and F³, and the said plates are connected with each other by rivets or bolts G³, on which are mounted loosely friction-rollers G⁴, traveling on the diverging arms F² and F³, as plainly indicated in Fig. 2. When the handle G is in an innermost position, as previously explained, then the resiliency of the split ring F' holds the latter sufficiently out of frictional contact with the disk E for the latter to rotate freely; but when the handle G is slipped outward along the arms F² and F³ then the said arms are pressed toward each other by the action of the friction-rollers G⁴, and consequently the split ring F' clamps the disk E with increasing force as the handle G is moved outward.

In order to limit the outward sliding movement of the handle G on the arms F² and F³, the terminals thereof are provided with lugs F⁴ for the front friction-rollers G⁴ to abut against. The flanges E' and E² of the friction-disk E hold the split ring F' against transverse movement, and the friction-disk E is held against displacement on the polygonal end D' of the shaft D by a screw H screwing in the said shaft and having its head engaging the outer face of the friction-disk.

In order to counterbalance the crank-arm F, the disk F' is provided with an extensionarm $F^5$ opposite the arms $F^2$ and $F^3$, and on the terminal of this arm $F^5$ is a suitable weight $F^6$, as plainly shown in the drawings.

By the arrangement described it will be seen that the operator by moving the handle G inward or outward on the diverging arms $F^2$ and $F^3$ causes a clamping of the split ring $F'$ with less or more force on the friction-disk E, secured to the shaft, and consequently the operator can give any desired freedom of movement to the spool B when the line is running out and prevent backlash by lightly applying the brake and after the fish is hooked give any desired resistance to the reel with a view to increase or decrease the tension as circumstances require. It will further be seen that when the handle G is moved outward and the friction between the friction-disk E and the split ring $F'$ is increased the leverage of the crank-arm F is correspondingly increased as the crank-arm handle G moves farther from the axis of the shaft D.

Having thus described my invention, I claim as new and desire to secure by Letters Patent—

1. A fishing-reel brake comprising a crank-arm, and a friction device controlled by the handle of the crank-arm, the handle being slidably mounted on the crank-arm to increase or decrease the friction and correspondingly increase or decrease the leverage.

2. A fishing-reel brake comprising a friction-disk on a reel-shaft, and a crank-arm peripherally mounted on the friction-disk and adapted to be clamped with more or less force to the peripheral face of the friction-disk.

3. A fishing-reel brake comprising a friction-disk on a reel-shaft, a crank-arm peripherally mounted on the friction-disk, a frictional clamping device on the said arm, for clamping the latter to the friction-disk at the peripheral face thereof, and a handle movable on the crank-arm and controlling the said clamping device.

4. A fishing-reel brake comprising a friction-disk on a reel-shaft, a crank-arm mounted on the peripheral face of the friction-disk, and having a movable handle, and a clamping device controlled by the said handle for clamping the crank-arm to the friction-disk.

5. A fishing-reel brake comprising a friction-disk turning with a reel-shaft, and a crank-arm mounted on the peripheral face of the friction-disk and having manually-controlled means for clamping the crank-arm with more or less force to the said friction-disk.

6. A fishing-reel brake comprising a friction-disk secured on the shaft of the reel, a crank-handle having a split ring mounted on the peripheral face of the friction-disk, the ends of the split ring terminating in integral diverging arms, and a handle slidable on the arms and straddling the same.

7. A fishing-reel brake, comprising a friction-disk on the reel-shaft, a crank-arm peripherally mounted on the said disk, and a handle slidable on the crank-arm and serving to clamp the same to the friction-disk.

8. A fishing-reel brake, comprising a friction-disk on the reel-shaft, a crank-arm peripherally mounted on the disk and having diverging members, and a handle slidably mounted on the diverging members of the crank-arm.

9. A fishing-reel brake, comprising a friction-disk on the reel-shaft, a crank-arm having a split ring mounted on the periphery of the disk and provided with diverging arms at one side and a weighted arm at the opposite side, and a handle slidably mounted on the diverging arms of the crank-arm.

In testimony whereof I have signed my name to this specification in the presence of two subscribing witnesses.

JAMES A. MacMAHON.

Witnesses:
A. M. FRASER,
ANTHONY J. CARTER.